United States Patent
Kim et al.

(10) Patent No.: US 11,513,857 B2
(45) Date of Patent: Nov. 29, 2022

(54) DATA PROCESSING SYSTEM AND ACCELERATOR THEREFOR

(71) Applicant: SK hynix Inc., Icheon (KR)

(72) Inventors: Joo Young Kim, Icheon (KR); Yong Sang Park, Icheon (KR)

(73) Assignee: SK hynix Inc., Icheon (KR)

( * ) Notice: Subject to any disclaimer, the term of this patent is extended or adjusted under 35 U.S.C. 154(b) by 243 days.

(21) Appl. No.: 16/908,046

(22) Filed: Jun. 22, 2020

(65) Prior Publication Data

US 2021/0182109 A1     Jun. 17, 2021

(30) Foreign Application Priority Data

Dec. 17, 2019   (KR) .................... 10-2019-0168908

(51) Int. Cl.
| | | |
|---|---|---|
| G06F 9/50 | (2006.01) | |
| G06N 3/063 | (2006.01) | |
| G06K 9/62 | (2022.01) | |
| H04L 49/90 | (2022.01) | |
| G06F 13/40 | (2006.01) | |

(52) U.S. Cl.
CPC ........ *G06F 9/5027* (2013.01); *G06F 13/4059* (2013.01); *G06K 9/6268* (2013.01); *G06N 3/063* (2013.01); *H04L 49/9026* (2013.01); *G05B 2219/21002* (2013.01)

(58) Field of Classification Search
CPC .... G06N 3/0454; G06N 3/063; G06F 9/5027; G06F 13/4059; G06K 9/6268; H04L 49/9026; G05B 2219/21002
See application file for complete search history.

(56) References Cited

U.S. PATENT DOCUMENTS

| | | | | |
|---|---|---|---|---|
| 11,100,016 | B2 * | 8/2021 | Nam | .................... G06F 13/1668 |
| 11,210,017 | B2 * | 12/2021 | Park | ..................... G06F 3/0679 |
| 11,262,982 | B2 * | 3/2022 | Park | ..................... G06F 7/5443 |
| 2018/0089562 | A1 * | 3/2018 | Jin | ......................... G06F 17/15 |
| 2020/0257959 | A1 * | 8/2020 | Jin | ..................... G06F 12/0646 |

FOREIGN PATENT DOCUMENTS

KR      20190043849 A      4/2019

OTHER PUBLICATIONS

"FPGA-Based accelerator for long short-term memory recurrent neural networks"—Yijin Guan, Zhihang Yuan, Guangyu Sun, Jason Cong; 2017 22nd Asia and South Pacific Design Automation Conference, dated Jan. 2017 (Year: 2017); 6 Pages.*
"An Energy-Efficient Reconfigurable LSTM Accelerator for Natural Language Processing"—Elham Azari and Sarma Vrudhula; 2019 IEEE International Conference on Big Data; dated Dec. 9-12, 2019 (Year: 2019) ; 10 Pages.*

* cited by examiner

*Primary Examiner* — Brian T Misiura

(57) ABSTRACT

A data processing system includes a host and an accelerator. The host transmits, to the accelerator, input data together with data identification information based on a data classification criterion. The accelerator classifies the input data as any one of feature data, a parameter, and a bias based on the data identification information when the input data is received from the host, distributes the input data, performs pre-processing on the feature data, and outputs computed result data to the host or feeds the result data back so that computation processing is performed on the result data again.

20 Claims, 9 Drawing Sheets

FIG.3

Address Map

| Address Range | Region | Access |
|---|---|---|
| 0x003F_FFFF ~ 0x0030_0000 | (1MB)-Output Hidden | Read Only |
| 0x002F_FFFF ~ 0x0020_0000 | (1MB)-Input Vector | Write Only |
| 0x001F_FFFF ~ 0x0010_0000 | (1MB)-Hidden Init | Write Only |
| 0x000F_FFFF ~ 0x0000_0000 | (1MB)-Bias Init | Write Only |

FIG.4

Host Signal

| Precision | Signal bits |
|---|---|
| floating point 32 | 00 |
| floating point 16 | 01 |
| b floating point 16 | 10 |
| integer 8 | 11 |

DATA PROCESSING SYSTEM AND ACCELERATOR THEREFOR

CROSS-REFERENCES TO RELATED APPLICATION

The present application claims priority under 35 U.S.C. § 119(a) to Korean Patent Application Number 10-2019-0168908, filed on Dec. 17, 2019, in the Korean Intellectual Property Office, which is incorporated herein by reference in its entirety.

BACKGROUND

1. Technical Field

Various embodiments generally relate to a data processing system and an accelerator therefor.

2. Related Art

In a neural network, an accelerator has a data buffer placed between the accelerator and a host. The data buffer is a simple buffer that is used to reduce latency taken for data transmission between the host and the accelerator.

A time taken to perform actual computations may be increased because different types and sizes of data are applied as various types of neural networks are used.

SUMMARY

Embodiments are directed to a data processing system for improving computation performance by performing a pre-processing task on input data, and an accelerator therefor.

In an embodiment, a data processing system may include a host configured to transmit input data together with data identification information generated based on a data classification criterion; and an accelerator configured to receive the input data from the host, classify the input data as one of feature data, a parameter, and a bias based on the data identification information, distribute the classified input data to a corresponding buffer, perform pre-processing on the classified input data that is the feature data, perform computation processing on the classified input data, and output result data of the computation processing to the host or feed the result data back to the accelerator so that the computation processing is performed on the result data again.

In an embodiment, an accelerator may include a data processor configured to receive input data from a host, classify the input data as one of feature data, a parameter, and a bias based on data identification information generated based on a data classification criterion, distribute the input data that has been classified to a corresponding buffer of a computation unit, transform precision of the input data classified as the feature data, transmit the feature data to the corresponding buffer, receive result data of performing computation processing on the input data from the computation unit, check a sequence of the result data, and transmit the result data to the host or feed the result data back to the computation unit based on a result of checking; and the computation unit configured to perform computations using the input data received from the data processor and a weight, and transmit the result data to the data processor.

In an embodiment, an operation method of an accelerator may include receiving input data from a host and classifying the input data as one of feature data, a parameter, and a bias based on data identification information generated based on a data classification criterion, by a data type checker; distributing, by the data type checker, the input data that classified as the parameter or the bias to a corresponding buffer in a computation unit; transforming precision of the input data classified as the feature data and distributing the feature data to a corresponding buffer in the computation unit, by a transformation unit; performing, by the computation unit, computation processing using the distributed input data and a weight; receiving result data of the computation processing and comparing a sequence of the result data with a completion sequence, by an output unit; transmitting, as output data, the result data to the host when the sequence of the result is identical with the completion sequence, by the output unit; and performing the computation processing again using the result data without transmitting the result data to the host when the sequence of the result is not identical with the completion sequence, by the computation unit.

BRIEF DESCRIPTION OF THE DRAWINGS

FIGS. 3 to 5 are diagrams for describing a method of classifying input data in the data processing system of FIG. 1 according to an embodiment of the present disclosure.

DETAILED DESCRIPTION

Hereinafter, a data processing system and an accelerator therefor will be described below with reference to the accompanying drawings through various embodiments.

Figure 1:
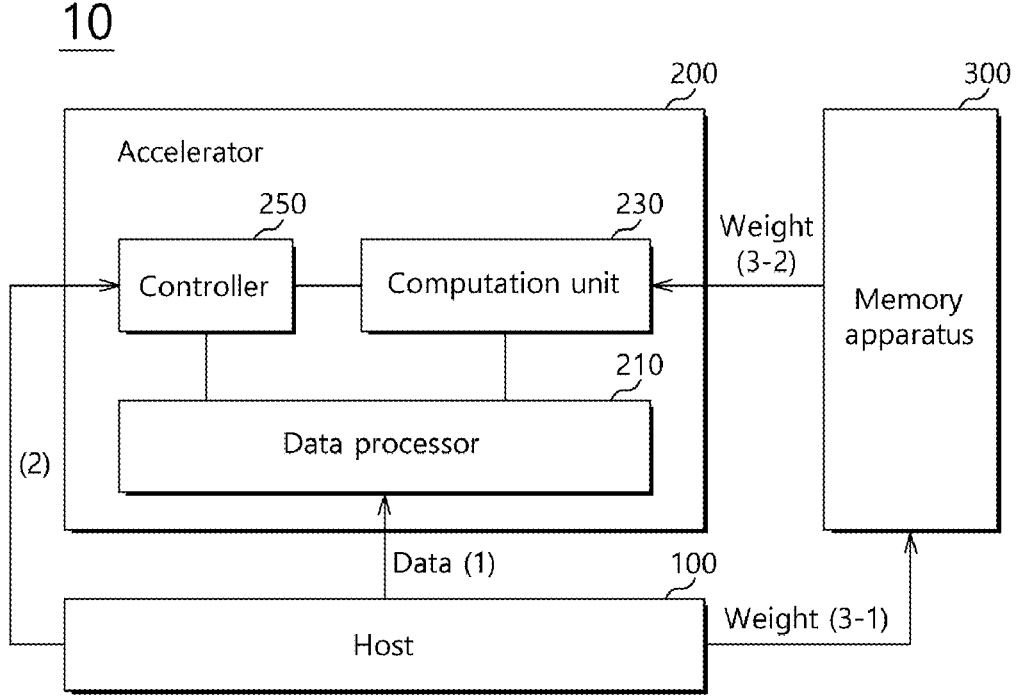
FIG. 1 is a diagram illustrating a data processing system according to an embodiment of the present disclosure.
Figure 2:
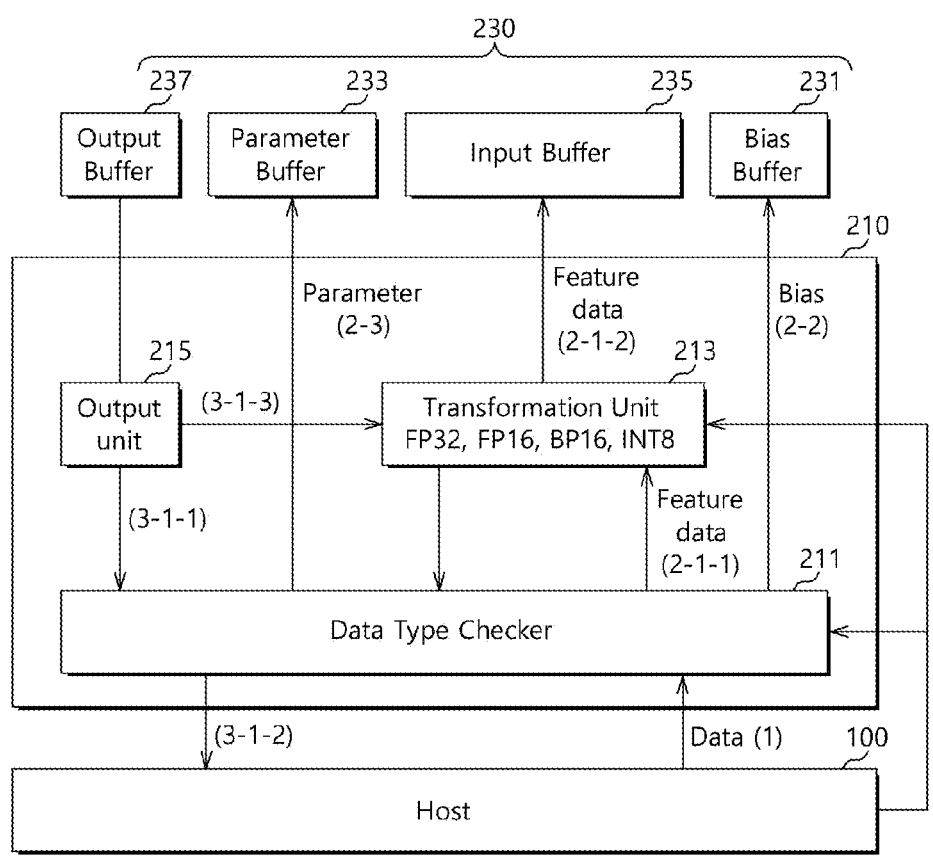
FIG. 2 is a diagram for describing a method of classifying input data in the data processing system of FIG. 1 according to an embodiment of the present disclosure.

FIG. 1 is a diagram illustrating a data processing system 10 according to an embodiment of the present disclosure. FIG. 2 is a diagram for describing a method of classifying input data in the data processing system of FIG. 1 according to an embodiment of the present disclosure.

Referring to FIG. 1, the data processing system 10 may include a host 100, an accelerator 200, and a memory apparatus 300.

The host 100 may transmit, to the accelerator 200, input data together with data identification (ID) information generated based on a data classification criterion ((1) in FIG. 1).

In this case, the data classification criterion means a criterion for classifying the input data as one of a parameter, a bias, and feature data. The data ID information includes various types of ID information for identifying the parameter, the bias, and the feature data. In this case, the data ID information may include precision information (Precision Info) and a data type (Data type). For example, the data type may be indicated in various forms, such as an address for identifying specific data, one or more bits for identifying the specific data, or an actual data type name of the specific data.

The host 100 may determine precision of the input data based on various types of conditions, such as a data type and latency of the input data, and may transmit the precision information to the accelerator 200, the precision information representing the precision of the input data.

For example, if the input data requires relatively fast processing, the host 100 may set the precision of the input data as an 8-bit integer (INT8) not a high-precision floating point 32 (FP 32) so that the latency of the input data is reduced compared to the high-precision floating point 32. Furthermore, if the input data requires a relatively wide range in which the input data may be included, the host 100 may set the precision of the input data as a b floating point 16 (BP16) not a half-precision floating point 16 (FP16).

If a neural network disclosed in the present embodiment is assumed to be long short-term memory models (LSTM), data input to the host 100 may be negative, but embodiments are not limited thereto. Furthermore, the neural network is not limited to the LSTM, and the neural network may be one of various types of neural networks.

When the input data is received, the host 100 may generate the data ID information, including the data type and the precision information corresponding to the input data, based on the data classification criterion, and may transmit the data ID information to the accelerator 200 when transmitting the input data.

If the input data is one of a parameter and a bias, the host 100 may transform the precision of the input data into precision corresponding to the parameter or the bias, and may transmit the input data and the data ID information including the transformed precision to the accelerator 200. In this case, the input data may be an initial value of the parameter (parameter-initial value) or an initial value of the bias (bias-initial value), but embodiments are not limited thereto.

If the precision of the input data is the high-precision floating point 32 (FP32), the host 100 may transform the precision of the input data into the half-precision floating point 16 (FP16).

A parameter, such as a Ct-initial value and an Ht-initial value of an LSTM cell, and a bias are not data that are input in real time. Accordingly, the host 100 may previously transform the precision of the parameter and the precision of the bias and then transmit the parameter and the bias so that they are stored in the accelerator 200 prior to actual computation processing.

According to the present embodiment, both the host 100 and the accelerator 200 may classify the input data. Accordingly, the host 100 performs the transformation of precision on the parameter and the bias prior to a computation operation (or computation processing). The accelerator 200 performs the transformation of precision on only feature data input through the host 100 in real time after the computation operation started. Accordingly, data input latency can be reduced.

When the input data is received from the host 100, the accelerator 200 may classify the input data as one of the feature data, the parameter, and the bias based on the data ID information, and then may distribute the input data to a plurality of buffers in a computation unit 230.

Referring to FIG. 2, the computation unit 230 may include an input buffer 235, a parameter buffer 233, a bias buffer 231, and an output buffer 237.

The accelerator 200 may perform pre-processing on the feature data, and may output, as output data, result data of the computation processing to the host 100 or may feed the result data back to the computation unit 230 so that the computation processing is performed on the result data again. Detailed technology for feeding the result data back to the computation unit 230 of the accelerator 200 will be described later.

The aforementioned pre-processing may be an operation of transforming the input data, including the feature data, into a format suitable for the computation processing prior to the computation processing. For example, the pre-processing may include a precision transformation.

Referring back to FIG. 1, the accelerator 200 may include a data processor 210, the computation unit 230, and a controller 250.

When the input data is received from the host 100, the data processor 210 classifies the input data as one of the feature data, the parameter, and the bias based on the data ID information, and distributes the input data to a corresponding buffer within the computation unit 230. In this case, the data processor 210 may transform the precision of the input data classified as the feature data and transmit the feature data to the corresponding buffer. In this case, the corresponding buffer may be one of the input buffer 235, the parameter buffer 233, and the bias buffer 231.

The data processor 210 may transmit, to the host 100 or the computation unit 230, the result data of the computation processing provided by the computation unit 230 after the computation processing. Specifically, the data processor 210 compares a sequence of the result data, provided by the computation unit 230 after the computation processing, with a completion sequence. If the sequence of the result data is identical with the completion sequence as a result of the comparison, the data processor 210 may transmit the result data to the host 100. If the sequence of the result data is not identical with the completion sequence, i.e., the sequence of the result data is different from the completion sequence, as a result of the comparison, the data processor 210 may feed the result data back to the computation unit 230.

The sequence of the result data means a dimension of an LSTM cell, and may mean the number of times that the computation processing has been repeated. The completion sequence means a dimension of an LSTM cell in which result data needs to be transmitted to the host 100 as output data after the completion of computation processing, and may mean the number of times that the computation processing has been repeated at the computation completion timing.

After performing the computation processing using the input data received from the data processor 210 and a weight, the computation unit 230 may transmit the result data to the data processor 210. The computation processing may mean any computation which may be performed in the computation unit 230 of the accelerator 200 applied to the neural network. In the present embodiment, the computation processing may be 32-bit floating point multiplication processing, but embodiments are not limited thereto.

In this case, the result data on which the computation processing has been performed is transmitted to an output unit 215 in the data processor 210 via the output buffer 237.

The controller 250 may receive various types of commands including an operation start command, a completion sequence, and precision of output data from the host 100 ((2) in FIG. 1), and may control operations of the computation unit 230 and the data processor 210 based thereon.

For example, the input data transmitted from the host 100 to the accelerator 200 and the precision information of a bit form corresponding to the input data may be input through different pins implemented in the data processor 210 of the accelerator 200. In this case, the data processor 210 may identify the input data and the precision information corresponding to the input data because the input data and the precision information have been synchronized with each other. When the operation start command is received from the controller 250, the data processor 210 may start the execution of a precision transformation operation based on the input data and the precision information.

The memory apparatus 300 may receive the weight from the host 100 and store the weight ((3-1) in FIG. 1), and may transmit the stored weight to the computation unit 230 ((3-2) in FIG. 1). In this case, the memory apparatus 300 may be a dynamic random access memory (DRAM), but embodiments are not limited thereto.

Figure 5:
Figure 6:
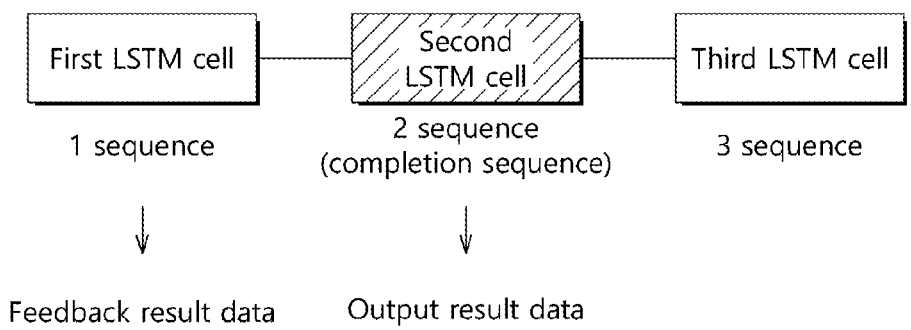
FIGS. 6 to 8 are diagrams for describing a method of feeding result data back in the data processing system of FIG. 1 according to an embodiment of the present disclosure.
Figure 7:
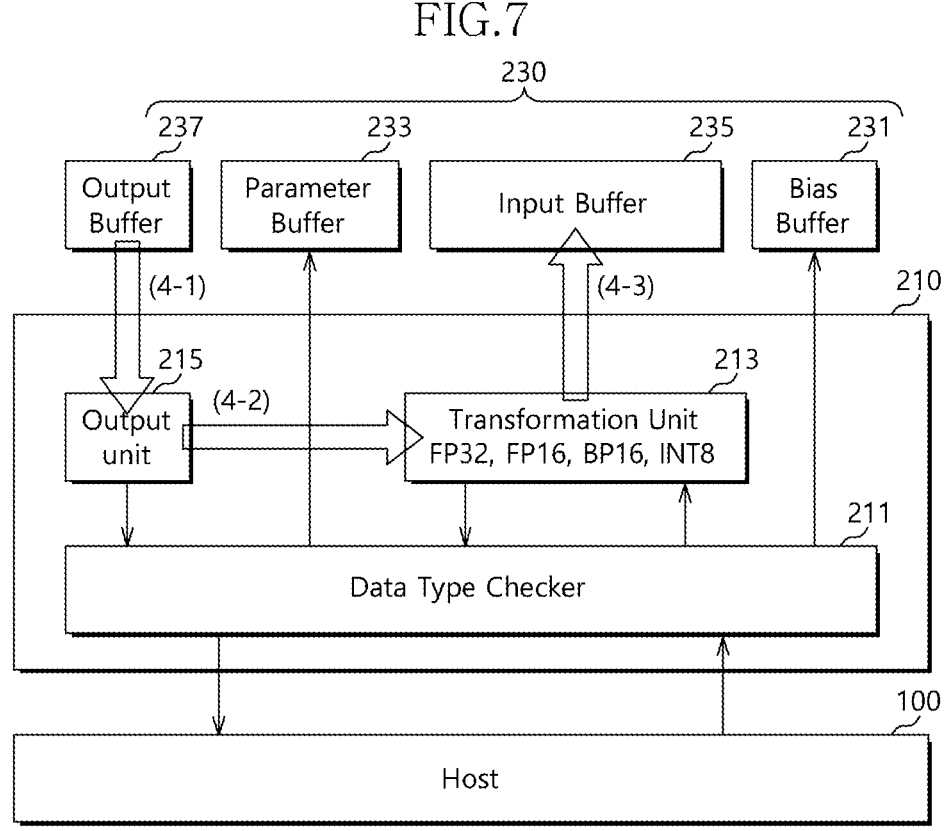
Figure 8:
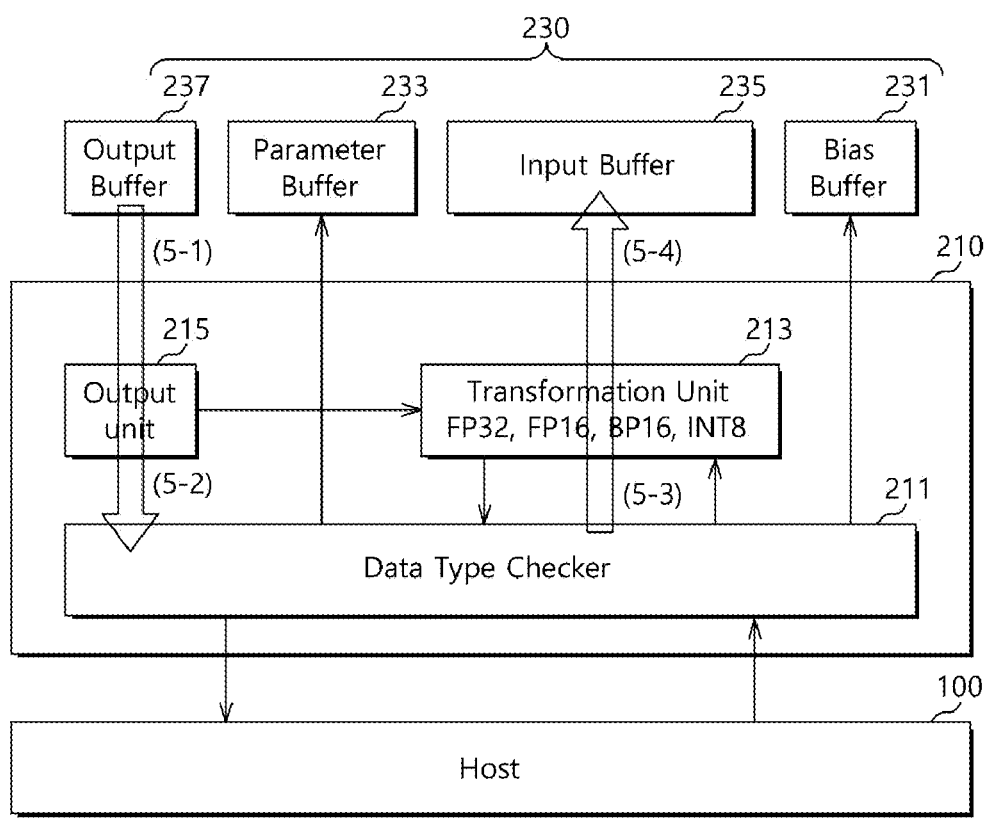
Figure 9:
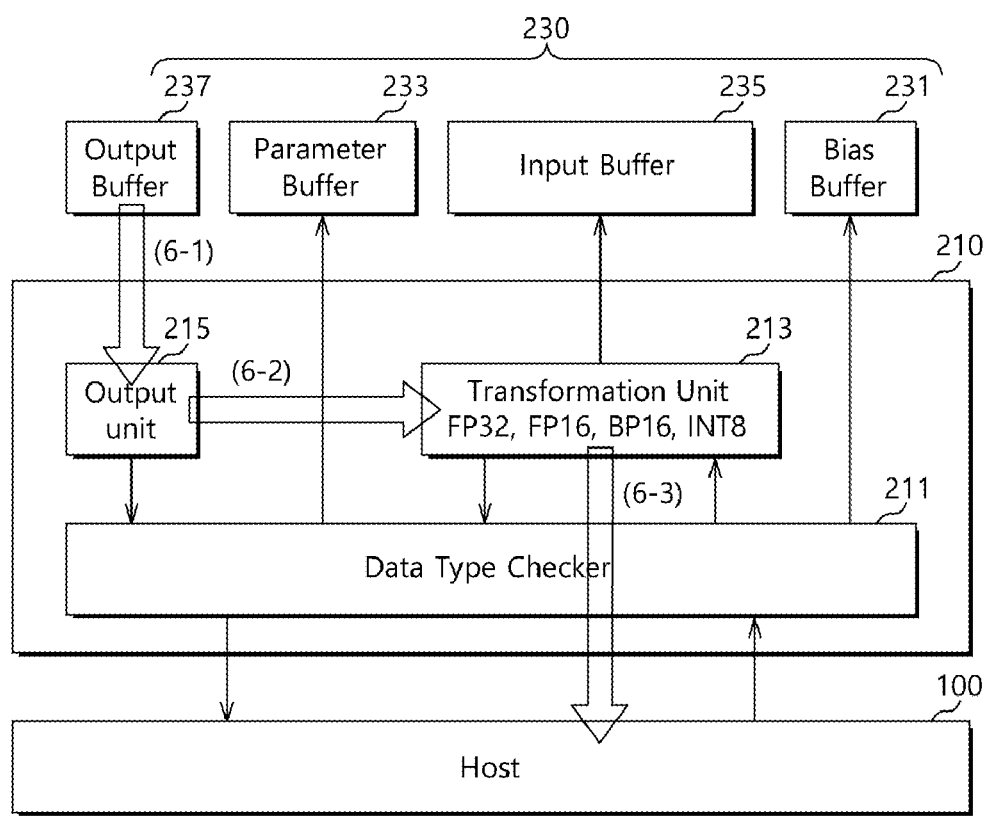
FIG. 9 is a diagram for describing a method of outputting result data in the data processing system of FIG. 1 according to an embodiment of the present disclosure.

FIGS. 3 to 5 are diagrams for describing a method of classifying input data in the data processing system of FIG. 1 according to an embodiment of the disclosure. FIGS. 6 to 8 are diagrams for describing a method of feeding the result data back in the data processing system of FIG. 1 according to an embodiment of the disclosure. FIG. 9 is a diagram for describing a method of outputting the result data in the data processing system of FIG. 1 according to an embodiment of the disclosure.

Referring back to FIG. 2, the data processor 210 may include a data type checker 211, a transformation unit 213, and the output unit 215.

The data type checker 211 may receive the input data from the host 100 ((1) in FIG. 2), classify the input data as one of the feature data, the parameter, and the bias based on the data ID information of the input data, and distribute the classified input data to a corresponding one of the plurality of buffers 235, 231, and 233 ((2-1-1) and (2-1-2), (2-2), or (2-3) in FIG. 2).

In this case, the data ID information may include the precision information (Precision Info) and the data type (Data type) of the input data. For example, a data type may be indicated in various forms, such as an address for identifying specific data, bits for identifying the specific data, or an actual data type name of the specific data.

If the input data is the parameter or the bias, the data type checker 211 may directly transmit the parameter or the bias to the parameter buffer 233 or the bias buffer 231, respectively, because the precision transformation has been already performed on the parameter or the bias in the host 100.

If the input data is the feature data, the data type checker 211 may transmit the feature data to the transformation unit 213 ((2-1-1) in FIG. 2) instead of directly transmitting the feature data to the input buffer 235. The feature data may be transmitted to the input buffer 235 after the precision of the feature data is transformed in the transformation unit 213 ((2-1-2) in FIG. 2).

The data type checker 211 may compare an address corresponding to the input data with an address map to classify the input data as one of the feature data, the parameter, and the bias, and may distribute the feature data to the input buffer 231, the parameter to the parameter buffer 233 ((2-3) in FIG. 2), and the bias to the bias buffer 231 ((2-2) in FIG. 2) based on a result of the comparison. The address corresponding to the input data may represent a data type of the input data.

Referring to FIG. 3, the data type checker 211 of FIG. 2 may store the address map including addresses corresponding to the feature data, the parameter, the bias, and output data, respectively. In this case, when transmitting the feature data, the parameter, and the bias to the accelerator 200, the host 100 may also transmit the addresses corresponding to the feature data, the parameter, and the bias with reference to the address map.

As illustrated in FIG. 3, in the address map, 0X0000_0000 to 0X000F_FFFF may be matched with Bias Init, 0X0010_0000 to 0X001F_FFFF may be matched with Hidden Init, 0X0020_0000 to 0X002F_FFFF may be matched with Input Vector, and 0X0030_0000 to 0X003F_FFFF may be matched with Output Hidden. In this case, Bias Init may mean a bias-initial value, Hidden Init may mean a parameter-initial value such as a Ct-initial value and an Ht-initial value, Input Vector may mean the feature data, and Output Hidden may mean the output data of computed result data.

The data type checker 211 may classify the input data, received from the host 100, as one of the feature data, the parameter, and the bias by confirming an address transmitted along with the input data. Furthermore, the data type checker 211 may identify data as output data by confirming an address received along with the data received from the output unit 215 or the computation unit 230. To this end, the output unit 215 and the computation unit 230 may previously store an address map or may access an area in which the address map has been stored and may identify the data.

In order to rapidly identify a data type, the data type checker 211 may confirm only portions of the addresses by which the feature data, the parameter, the bias, and the output data can be mutually identified from each other. For example, the data type checker 211 may identify a data type by confirming only 21-th and 22-th bits (e.g., 00 to 0F, 10 to 1F, 20 to 2F and 30 to 3F) of each address among the addresses illustrated in FIG. 3.

For another example, when the input data and the precision information of a bit form corresponding to the input data are received from the host 100, the data type checker 211 may transmit the input data to the input buffer 235.

Referring to FIG. 4, a host signal may include signal bits corresponding to precision information of a bit form received from the host 100 for each precision. For example, the signal bits may be 00 when the precision is a floating point 32, the signal bits may be 01 when the precision is a floating point 16, the signal bits may be 10 when the precision is a b floating point 16, and the signal bits may be 11 when the precision is an integer 8.

The data type checker 211 can confirm corresponding precision although it receives only the precision information, such as 00, 01, 10, or 11, because the signal bits of precision corresponding to the precision information of a bit form (00, 01, 10 or 11 in FIG. 4) have been previously stored in the data type checker 211 as illustrated in FIG. 4.

When the precision information of a bit form is received from the host 100 together with the input data, the data type checker 211 may determine the input data as the feature data and transmit the input data to the input buffer 235.

Referring back to FIG. 2, the input data and the precision information of a bit form (signal bits in FIG. 4) corresponding to the input data, which are received from the host 100, may be transmitted to the accelerator 210 through different paths. Specifically, the input data may be transmitted through a first path (not illustrated) between the host 100 and the data type checker 211. The precision information may be transmitted through a second path (not illustrated) between the host 100 and the data type checker 211. That is, pins through which the input data and the precision information of a bit form are received may be differently configured in the data type checker 211. Alternatively, the pins through which the input data and the precision information are received may be identically implemented in the data type checker 211, so that both the input data and the precision information are received through the same path, e.g., the first path. Furthermore, the host 100 may directly transmit the precision information of a bit form to the transformation unit 213. In this case, the transformation unit 213 may previously store the signal bits associated with precision corresponding to the precision information of a bit form.

For another example, when the input data received from the host 100 has a packet data format, the data ID information may be included in packet data. The data type checker 211 may classify the input data based on the data ID information included in the packet data, and may distribute the input data to one of the input buffer 235, the parameter buffer 233, and the bias buffer 231.

Referring to FIG. 5, input data of a packet data format may include at least one of neural network information (NN Info), data information (Data Info), user definition information (User Define Info), and data ID information. In this case, the data information may be one of feature data (i.e., actual data), a parameter and a bias. The user definition information means information generated depending on user's needs, and corresponding contents thereof are not fixed, but may be changed depending on the user's needs.

The data ID information may include precision information (Precision Info) and a data type (Data type). For example, the data type may be indicated in any of various forms, such as an address for identifying specific data, bits for identifying the specific data, or an actual data type name of the specific data.

The data type checker 211 may determine whether the input data is the feature data, the parameter, or the bias based on the data type of the input data.

The data type checker 211 may transmit the precision information to the transformation unit 213 so that the precision of the input data is transformed based on the precision information, but embodiments are not limited thereto. The host 100 may directly transmit the precision information to the transformation unit 213 instead of transmitting the precision information via the data type checker 211.

The transformation unit 213 may transform the precision of the feature data based on the precision information included in the data ID information.

The transformation unit 213 may transform the precision of the input data, received from the data type checker 211, based on the precision information received from the host 100.

For example, the transformation unit 213 may perform the precision transformation of the input data of a high-precision floating point 32 (FP32) to precision of any one of a half-precision floating point 16 (FP16), a b floating point 16 (BP16), and an 8-bit integer (INT8). Precision applied to the present embodiment is not limited to the high-precision floating point 32 (FP 32), the half-precision floating point 16 (FP16), the b floating point 16 (BP16), and the 8-bit integer (INT8), and another precision may be additionally applied depending on an operator.

Furthermore, the transformation unit 213 may perform precision transformation for computed result data based on output precision requested by the host 100 before outputting, as the output data, the computed result data to the host 100. The output precision is precision of the output data, requested by the host 100.

Specifically, when the result data scheduled to be output is received from the output unit 215, the transformation unit 213 may transform the precision of the result data into the output precision, and may transmit the result data to the data type checker 211.

For example, the transformation unit 213 may transform the precision of the result data, which is one of a half-precision floating point 16 (FP16), a b floating point 16 (BP16), and an 8-bit integer (INT8), into a high-precision floating point 32 (FP 32), and may transmit the result data to the host 100 via the data type checker 211.

When a sequence of the result data received from the computation unit 230 is identical with a completion sequence as a result of comparing the sequence of the result data with the completion sequence, the output unit 215 may output the result data to the host 100 ((3-1-1) and (3-1-2) in FIG. 2). When the sequence of the result data is not identical with the completion sequence as the result of the comparison, the output unit 215 may feed the result data back to the computation unit 230 ((3-1-3) in FIG. 2). The output unit 215 may recognize the completion sequence because it has previously received the completion sequence from the controller 250. The sequence of the result data means a dimension of an LSTM cell, and may mean the number of times that the computation processing has been repeated. The completion sequence means a dimension of an LSTM cell in which result data needs to be transmitted to the host 100 as the output data after the completion of the computation processing, and may mean the number of times that the computation processing has been repeated at the computation completion timing. In this case, the completion sequence may be changed based on ID information of an LSTM cell in which the result data needs to be output, rather than the dimension of the LSTM cell.

Referring to FIG. 9, when the sequence of the result data is identical with the completion sequence as a result of the comparison, the output unit 215 may transmit the result data to the transformation unit 213, so that the precision of the result data is transformed based on the output precision and then the result data is output to the host 100 (refer to (6-1), (6-2), and (6-3) in FIG. 9).

Referring to FIG. 6, if the completion sequence is a 2 sequence corresponding to a second LSTM cell, the output unit 215 may check whether an LSTM cell corresponding to the result data received from the output buffer 237 is the second LSTM cell, and may output the result data to the host 100 when the LSTM cell is the second LSTM cell as a result of the checking. In this case, the output unit 215 may transmit the result data to the transformation unit 213 so that the transformation unit 213 transforms the precision of the result data to the output precision requested by the host 100, and may output the result data to the host 100. Transforming the precision of the result data to the output precision is for minimizing an operation performed in the host 100. The precision transformation procedure can be omitted in the host 100 because the transformation unit 213 previously performs the precision transformation on the result data. Accordingly, an operation load of a precision transformation operation can be reduced in the host 100.

When the sequence of the result data is not identical with the completion sequence as a result of the comparison, the output unit 215 may transmit the result data to the transformation unit 213 so that the result data is fed back to the computation unit 230 (refer to (4-1), (4-2), and (4-3) in FIG. 7) or may transmit the result data to the data type checker 211 so that the result data is fed back to the computation unit 230 via the data type checker 211 (refer to (5-1), (5-2), (5-3), and (5-4) in FIG. 8).

Referring to FIG. 6, if the completion sequence is the 2 sequence corresponding to the second LSTM cell, the output unit 215 may check whether an LSTM cell corresponding to the result data received from the output buffer 237 is the second LSTM cell, and may feed the result data back to the computation unit 230 when, as a result of the checking, the LSTM cell corresponding to the result data is not the second LSTM cell. This case may correspond to a case where the sequence of the result data is a 1 sequence corresponding to a first LSTM cell, assuming that computation processing has been performed from the first LSTM cell.

In the present embodiment, if the computed result data needs to be input to the computation unit 230 again, the computation unit 230 does not receive the computed result data via the host 100, and the computed result data is fed back to the computation unit 230 within the accelerator 200. Accordingly, an overhead related to data input in a dataflow can be reduced.

Figure 10:
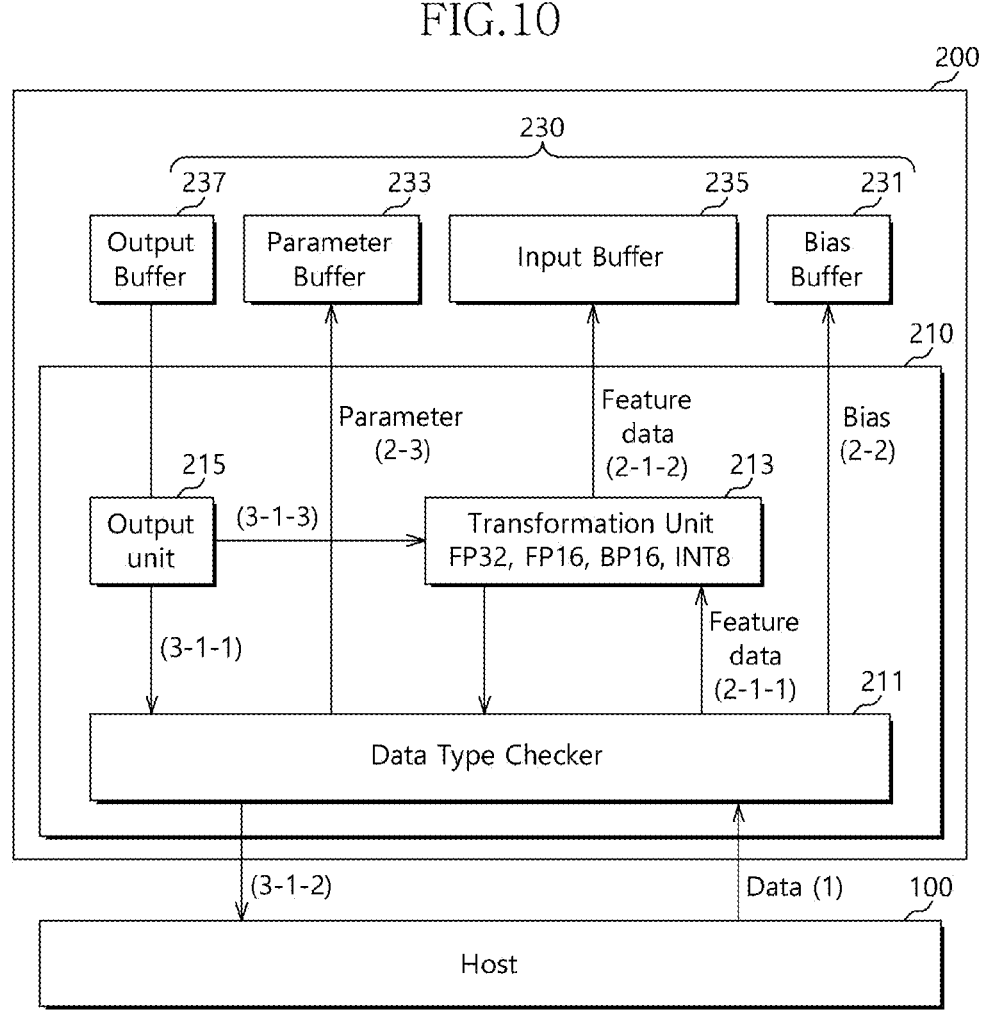
FIG. 10 is a detailed diagram illustrating an accelerator of the data processing system of FIG. 1 according to an embodiment of the present disclosure.

FIG. 10 is a diagram illustrating the accelerator 200 of the data processing system of FIG. 1 according to an embodiment of the present disclosure.

Referring back to FIG. 1, the accelerator 200 may include the data processor 210, the computation unit 230, and the controller 250.

When input data is received from the host 100 ((1) in FIG. 10), the data processor 210 may classify the input data as one of feature data, a parameter, and a bias based on data ID information generated based on a data classification criterion, and may distribute the input data to a corresponding buffer in the computation unit 230 ((2-1-1) and (2-1-2), (2-2), or (2-3) in FIG. 10).

The data processor 210 may transform the precision of the input data classified as the feature data, may transmit the feature data to the corresponding buffer ((2-1-1) and (2-1-2) in FIG. 10), may check a sequence of result data provided from the computation unit 230, and may transmit the result data to the host 100 or feed the result data back to the computation unit 230. In this case, when the input data is the parameter or the bias, the data processor 210 may transmit the input data directly to the bias buffer 231 or the parameter buffer 233 ((2-2) or (2-3) in FIG. 10) because the precision transformation on the parameter or the bias has already been performed in the host 100.

After performing computation processing using the input data received from the data processor 210 and a weight, the computation unit 230 may transmit the result data to the data processor 210. In this case, the weight may be stored in the memory apparatus 300 of FIG. 1, but embodiments are not limited thereto. In another embodiment, the weight may be stored in a separate memory (not illustrated) within the computation unit 230.

Referring to FIG. 10, the data processor 210 may include the data type checker 211, the transformation unit 213, and the output unit 215.

The data type checker 211 may classify the input data received from the host 100 as one of the feature data, the parameter, and the bias based on the data ID information of the input data, and may distribute the classified input data to a corresponding buffer. In this case, the corresponding buffer may be one of the input buffer 235, the parameter buffer 233, and the bias buffer 231.

The transformation unit 213 may transform the precision of the input data classified as the feature data based on precision information included in the data ID information of the input data.

The output unit 215 may compare a sequence of the result data received from the output buffer 237 of the computation unit 230 with a completion sequence. If the sequence of the result data is identical with the completion sequence as a result of the comparison, the output unit 215 may output the result data to the host 100. On the other hand, if the sequence of the result data is not identical with the completion sequence as the result of the comparison, the output unit 215 may feed the result data back to the computation unit 230 via the data type checker 211 or the transformation unit 213.

If the computed result data needs to be input to the computation unit 230 again, the computation unit 230 does not receive the computed result data via the host 100, and the computed result data is fed back to the computation unit 230 within the accelerator 200. Accordingly, an overhead related to data input in a dataflow can be reduced.

Referring to FIG. 10, the computation unit 230 may include the input buffer 235, the parameter buffer 233, the bias buffer 231, and the output buffer 237.

For example, the data type checker 211 may store an address map including addresses corresponding to the feature data, the parameter, the bias, and the output data, respectively, may compare an address corresponding to the input data with the address map to classify the input data as one of the feature data, the parameter, and the bias, and may distribute the feature data to the input buffer 235, the parameter to the parameter buffer 233, and the bias to the bias buffer 231 based on a result of the comparison. The address corresponding to the input data may represent a data type of the input data.

For another example, when the input data and precision information of a bit form corresponding to the input data are received from the host 100, the data type checker 211 may transmit the input data to the input buffer 235.

For another example, when the input data of a packet data format is received from the host 100, the data ID information of the input data is included in the packet data. The data type checker 211 may classify the input data based on the data ID information included in the packet data, and may distribute the input data to one of the input buffer 235, the parameter buffer 233, and the bias buffer 231.

The input data of the packet data format may include at least one of neural network information, data information, user definition information, and the data ID information. In this case, the data ID information may include the precision information and a data type.

Figure 11:
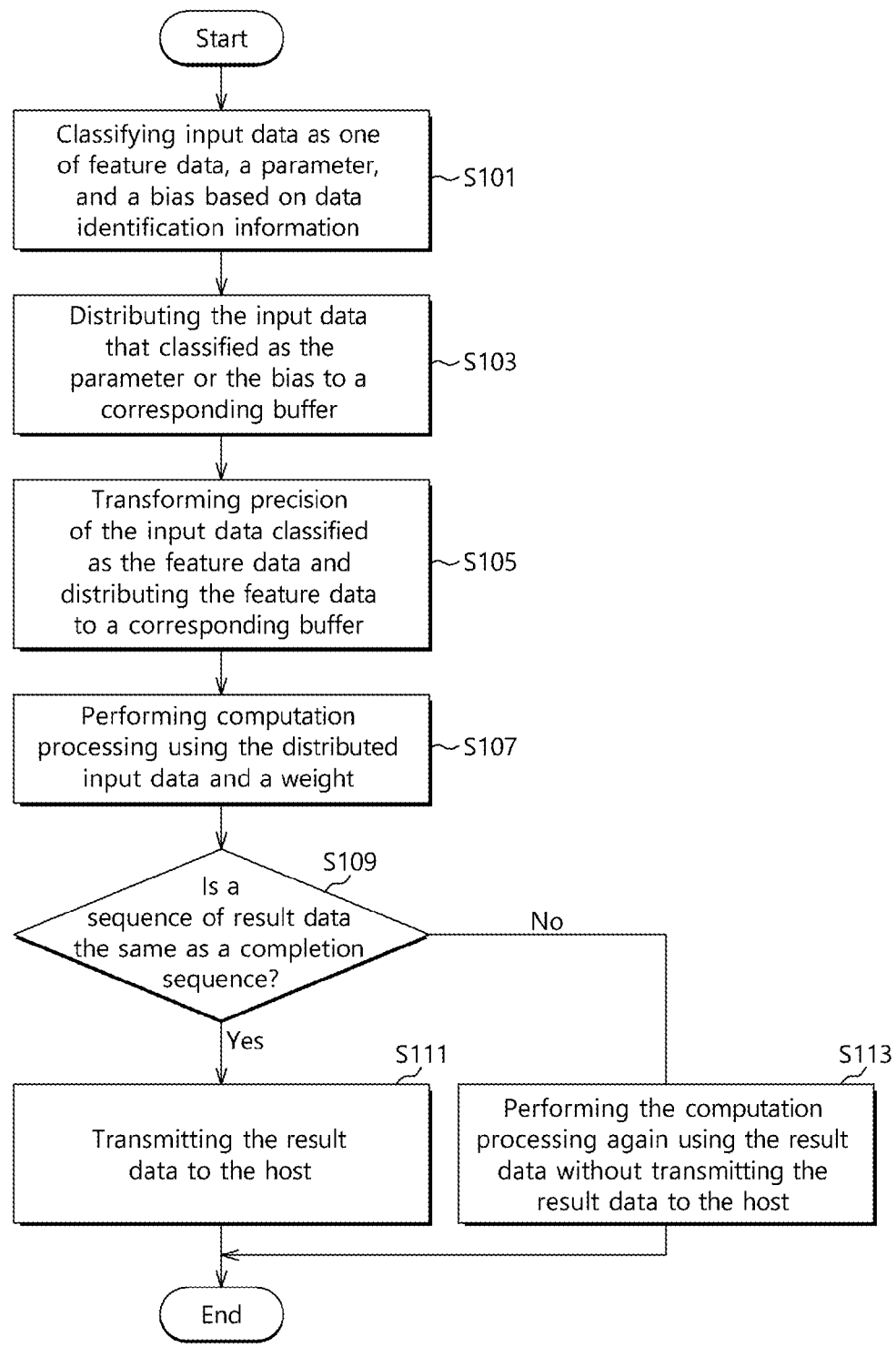
FIG. 11 is a flowchart for describing an operating method of an accelerator in accordance with an embodiment.

FIG. 11 is a flowchart for describing an operating method of an accelerator in accordance with an embodiment.

First, when receiving input data from a host, a data type checker 211 may classify the input data into one of feature data, a parameter, and a bias based on data identification information generated based on a data classification criterion in step S101.

The data type checker 211 may distribute input data classified as the parameter or the bias to a corresponding buffer in the computation unit 230 in step S103.

A transformation unit 213 may transfer precision of the input data classified as the feature data and distributing the feature data to a corresponding buffer in the computation unit 230 in step S105.

The computation unit 230 may perform computation processing using the distributed input data and a weight in step S107.

The output unit 215 may receive result data of the computation processing and compare a sequence of the result data with a completion sequence in step S109.

When the sequence of the result data is identical with the completion sequence as a result of the comparison, the output unit 215 may transmit the result data to the transformation unit 213, so that the precision of the result data is transformed based on the output precision and then the result data is output to the host 100 in step 111.

When the sequence of the result data is not identical with the completion sequence as a result of the comparison, the computation unit 230 may perform the computation processing again using the result data without transmitting the result data to the host 100 in step 113.

According to the embodiments of the present disclosure, it is possible to reduce data input latency because input data is classified based on a classification criterion and distributed to a corresponding destination within the accelerator and data processing performed in the host or the accelerator, if necessary.

Furthermore, according to the embodiments of the present disclosure, since a precision transformation and data feedback are performed in the accelerator, a dataflow in which result data is transmitted to the host to perform, e.g., the precision transformation, and then re-input to the accelerator is omitted, and thus it is possible to reduce an overhead.

While various embodiments have been described above, it will be understood to those skilled in the art that the embodiments described are by way of example only. Accordingly, the apparatus and method described herein should not be limited based on the described embodiments.

What is claimed is:

1. A data processing system, comprising:
   a host configured to transmit, to an accelerator, input data together with data identification information generated based on a data classification criterion; and
   the accelerator configured to receive the input data from the host, classify the input data as one of feature data, a parameter, and a bias based on the data identification information, distribute the classified input data to a corresponding buffer, perform pre-processing on the classified input data that is the feature data, perform computation processing on the classified input data, and output result data of the computation processing to the host or feed the result data back to the accelerator so that the computation processing is performed on the result data again,
   wherein the host transforms precision of the input data to precision corresponding the parameter or the bias when the input data is one of the parameter and the bias, and transmits the precision-transformed input data to the accelerator.

2. The data processing system according to claim 1, wherein the accelerator comprises:
   a data processor configured to classify the input data as one of the feature data, the parameter, and the bias based on the data identification information, distribute the classified input data to a corresponding one of a plurality of buffers in a computation unit, transform precision of the classified input data, which is the feature data, transmit the feature data to a corresponding one of the plurality of buffers, check a sequence of the result data, and transmit the result data to the host or feed the result data back to the computation unit; and
   the computation unit including the plurality of buffers and configured to perform the computation processing using the classified input data received from the data processor and a weight, and transmit the result data to the data processor.

3. The data processing system according to claim 2, wherein the accelerator further comprises:
   a controller configured to receive various types of commands, a completion sequence, and precision of output data from the host, and control operations of the computation unit and the data processor, the various types of commands including an operation start command.

4. The data processing system according to claim 3, wherein the data processor comprises:
   a data type checker configured to classify the input data, received from the host, as one of the feature data, the parameter, and the bias based on the data identification information of the input data, and distribute the classified input data to the plurality of buffers;
   a transformation unit configured to transform the precision of the feature data based on precision information included in the data identification information; and
   an output unit configured to compare the sequence of the result data, received from the computation unit, with the completion sequence, output the result data to the host when the sequence of the result data is identical with the completion sequence as a result of the comparison, and feed the result data back to the computation unit when the sequence of the result data is not identical with the completion sequence as the result of the comparison.

5. The data processing system according to claim 4, wherein the output unit compares the sequence of the result data with the completion sequence, transmits the result data to the transformation unit so that the precision of the result data is transformed based on output precision that is the precision of output data when the sequence of the result data is identical with the completion sequence as the result of the comparison, and outputs the result data to the host.

6. The data processing system according to claim 4, wherein when the sequence of the result data is not identical with the completion sequence as the result of the comparison, the output unit transmits the result data to at least one of the transformation unit or the data type checker, so that the result data is fed back to the computation unit.

7. The data processing system according to claim 4, wherein the computation unit comprises an input buffer, a parameter buffer, a bias buffer, and an output buffer.

8. The data processing system according to claim 7, wherein the data type checker stores an address map comprising addresses corresponding to the feature data, the parameter, the bias, and the output data, respectively, compares the input data with the address map to classify the input data to one of the feature data, the parameter, and the bias, and distributes the feature data to the input buffer, the parameter to the parameter buffer, and the bias to the bias buffer based on a result of the comparison.

9. The data processing system according to claim 7, wherein when the input data and precision information of a bit form corresponding to the input data are received from the host, the data type checker transmits the input data to the input buffer.

10. The data processing system according to claim 9, wherein the transformation unit transforms the precision of the classified input data, which is the feature data, received from the data type checker, based on the precision information received from the host.

11. The data processing system according to claim 7, wherein when the input data of a packet data format is received from the host, the data type checker classifies the input data based on the data identification information included in the packet data, and distributes the classified input data to one of the input buffer, the parameter buffer, and the bias buffer, and wherein the input data of the packet data format comprises at least one of neural network information, data information, user definition information, and the data identification information, and the data identification information comprises the precision information and a data type of the input data.

12. The data processing system according to claim 2, further comprising a memory apparatus configured to receive the weight from the host, store the weight, and transmit the weight to the computation unit.

13. The data processing system according to claim 1, wherein when the input data is received, the host generates the data identification information, including a data type and precision information corresponding to the input data, based on the data classification criterion, and transmits the data identification information when transmitting the input data to the accelerator.

14. An accelerator, comprising:
- a data processor configured to receive input data from a host, classify the input data as one of feature data, a parameter, and a bias based on data identification information generated based on a data classification criterion, distribute the input data that has been classified to a corresponding buffer of a computation unit, transform precision of the input data classified as the feature data, transmit the feature data to the corresponding buffer, receive result data of performing computation processing on the input data from the computation unit, check a sequence of the result data, and transmit the result data to the host or feed the result data back to the computation unit based on a result of checking; and
- the computation unit configured to perform computations using the input data received from the data processor and a weight, and transmit the result data to the data processor.

15. The accelerator according to claim 14, wherein the data processor comprises:
- a data type checker configured to classify the input data as one of the feature data, the parameter, and the bias based on the data identification information of the input data, and distribute the input data that has been classified to the corresponding buffer;
- a transformation unit configured to transform precision of the input data classified as the feature data, based on precision information included in the data identification information; and
- an output unit configured to compare the sequence of the result data, received from the computation unit, with a completion sequence, output the result data to the host when the sequence of the result data is identical with the completion sequence as a result of the comparison, and feed the result data back to the computation unit when the sequence of the result data is not identical with the completion sequence as the result of the comparison.

16. The accelerator according to claim 15, wherein the computation unit comprises an input buffer, a parameter buffer, a bias buffer, and an output buffer.

17. The accelerator according to claim 16, wherein the data type checker stores an address map comprising addresses corresponding to the feature data, the parameter, the bias, and output data, respectively, compares the input data with the address map to classify the input data to one of the feature data, the parameter, and the bias, and distributes the feature data to the input buffer, the parameter to the parameter buffer, and the bias to the bias buffer based on a result of the comparison.

18. The accelerator according to claim 16, wherein when the input data and precision information of a bit form corresponding to the input data are received from the host, the data type checker transmits the input data to the input buffer.

19. The accelerator according to claim 16, wherein when the input data of a packet data format is received from the host, the data type checker classifies the input data based on the data identification information included in the packet data, and distributes the input data that has been classified to one of the input buffer, the parameter buffer, and the bias buffer, and
wherein the input data of the packet data format comprises at least one of neural network information, data information, user definition information, and the data identification information, and the data identification information comprises the precision information and a data type of the input data.

20. An operation method of an accelerator, the method comprising:
- receiving input data from a host and classifying the input data as one of feature data, a parameter, and a bias based on data identification information generated based on a data classification criterion, by a data type checker;
- distributing, by the data type checker, the input data that classified as the parameter or the bias to a corresponding buffer in a computation unit;
- transforming precision of the input data classified as the feature data and distributing the feature data to a corresponding buffer in the computation unit, by a transformation unit;
- performing, by the computation unit, computation processing using the distributed input data and a weight;
- receiving result data of the computation processing and comparing a sequence of the result data with a completion sequence, by an output unit;
- transmitting, as output data, the result data to the host when the sequence of the result is identical with the completion sequence, by the output unit; and
- performing the computation processing again using the result data without transmitting the result data to the host when the sequence of the result is not identical with the completion sequence, by the computation unit.

* * * * *